June 27, 1961 J. F. GERBE 2,990,049
INDEXING AND READING SYSTEM
Filed Aug. 7, 1958 8 Sheets-Sheet 1

INVENTOR
John F. Gerbe
BY
HIS ATTORNEYS

June 27, 1961 J. F. GERBE 2,990,049
INDEXING AND READING SYSTEM
Filed Aug. 7, 1958 8 Sheets-Sheet 2

INVENTOR
John F. Gerbe
BY Rennie, Edmonds, Morton, Barrocas & Taylor
HIS ATTORNEYS

June 27, 1961 J. F. GERBE 2,990,049
INDEXING AND READING SYSTEM
Filed Aug. 7, 1958 8 Sheets-Sheet 3

INVENTOR
John F. Gerbe
BY
HIS ATTORNEYS

June 27, 1961  J. F. GERBE  2,990,049
INDEXING AND READING SYSTEM
Filed Aug. 7, 1958  8 Sheets-Sheet 4

INVENTOR
John F. Gerbe
BY
HIS ATTORNEYS

June 27, 1961  J. F. GERBE  2,990,049
INDEXING AND READING SYSTEM
Filed Aug. 7, 1958  8 Sheets-Sheet 5

INVENTOR
John F. Gerbe
BY Pennie, Edmonds, Morton, Barrows and Taylor
HIS ATTORNEYS

June 27, 1961   J. F. GERBE   2,990,049
INDEXING AND READING SYSTEM
Filed Aug. 7, 1958   8 Sheets-Sheet 6

INVENTOR
John F. Gerbe
BY
Pennie, Edmonds, Morton, Barrows and Taylor
HIS ATTORNEYS June 27, 1961  J. F. GERBE  2,990,049
INDEXING AND READING SYSTEM
Filed Aug. 7, 1958  8 Sheets-Sheet 8

INVENTOR
John F. Gerbe
BY
Pennie, Edmonds, Morton, Barrows & Taylor
HIS ATTORNEYS United States Patent Office 2,990,049
Patented June 27, 1961

2,990,049
INDEXING AND READING SYSTEM
John F. Gerbe, Mineola, N.Y. (% Tele-sonic Packaging Corp., 208 W. 27th St., New York, N.Y.), assignor, by direct and mesne assignments, of thirty percent to John P. Frank, Forest Hills, N.Y.; thirty percent to Howard Bardach, Great Neck, N.Y.; five percent to George Frankenthaler, New York, N.Y.; five percent to Henry Kohn, New York, N.Y.; and thirty percent to John Gerbe
Filed Aug. 7, 1958, Ser. No. 753,820
11 Claims. (Cl. 198—38)

This invention relates to apparatus for causing a desired action to take place at a remote location, and more particularly, to apparatus of this kind which includes mechanism for preselecting one of a plurality of remote points at which a predetermined action shall take place, and causing such action to occur in accordance with the preselection.

According to the invention there are provided two co-acting devices, namely an index device and a reading device or a plurality of such devices. The index device includes a frame structure and an actuator movably mounted therein, the movement of the actuator in its supporting frame causing the desired movement to take place when the index device has been engaged with a reading device under certain predetermined conditions. More precisely, the reading device comprises a body member having a plurality of equally-spaced parallel rails extending across one of its faces and forming channels between them. Certain of these rails have interruptions therein forming interconnecting passages between adjacent channels. These interruptions may be arranged in any one of a large number of patterns, depending upon the length and number of the rails.

The actuator of the index device is arranged to carry a plurality of fingers which are selectively shiftable from a retracted position to an extended position. These fingers are spaced to correspond with the rail spacing of the reading device or devices. By extending the fingers of the index device to form the same pattern as the interruptions in the rails of a reading device, and then bringing the two devices into engagement with one another by causing the fingers to travel between the corresponding rails, and at the same time exerting a force on the actuator, when the extended fingers reach the rail interruptions the actuator will be caused to move in its frame member carrying the projected fingers into their next adjacent rail channels.

The movement of the actuator which thus occurs is made to produce any action desired as, for example, the actuation of a switch in an electric circuit either to open or to close the circuit, or the opening or closing of a valve, door, gate, etc., the starting or stopping of a machine, or the actuation of a machine part, or the actuation of a gripping or holding device carried by the frame of the index device either to discharge or to pick up any article which it may be desired to move from one place to another.

While only relative movement between the index device and the reading device is required in order to bring them into engagement with one another, so that either member may be moved relative to the other, it is advantageous to arrange a plurality of stationary reading devices and to provide some means for carrying or conveying the index device from one to another of these reading devices in a predetermined sequence. The index device can be moved in a circuit so as to engage the reading devices successively, by any suitable means, such, for example, as an endless chain, a track or rail system with an endless conveyor for moving the index device, or the index device may be arranged to be self-propelled along the rail system, or be moved by an arm, or other part, of a machine.

Thus the system may constitute a part of an automatic machine for performing different machining operations and the station may be preselected for each work piece.

Further, the index device may be moved through a series of reading devices, one arranged at each of any desired number of stations. The pattern of the rail interruptions of the reading device at each station will, of course, be different and by extending the fingers of the actuator so that their pattern will agree with the pattern of rail interruptions at the desired station, the motion of the actuator can be caused to take place when the index device reaches that station.

Various modifications in this scheme of operations can be made and some of these will be referred to later on. Thus, for example, if the index device is provided with jaws for carrying a load, the motion of the actuator at one predetermined station can be made to close the jaws for the purpose of picking up a load, and a subsequent motion of the actuator, preselected for a subsequent station, will cause the jaws to open and discharge the load.

The invention will be better understood from a consideration of the accompanying drawings and the following detailed description.

In these drawings:
FIGS. 15–19 relate to modified forms of reading and index devices for use with the system of FIG. 13.

Figure 3:
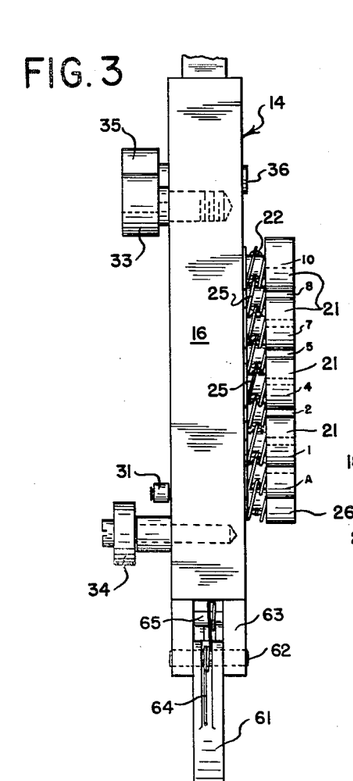
FIG. 3 is a side view of the device shown in FIG. 1 looking from the left.
Figure 4:
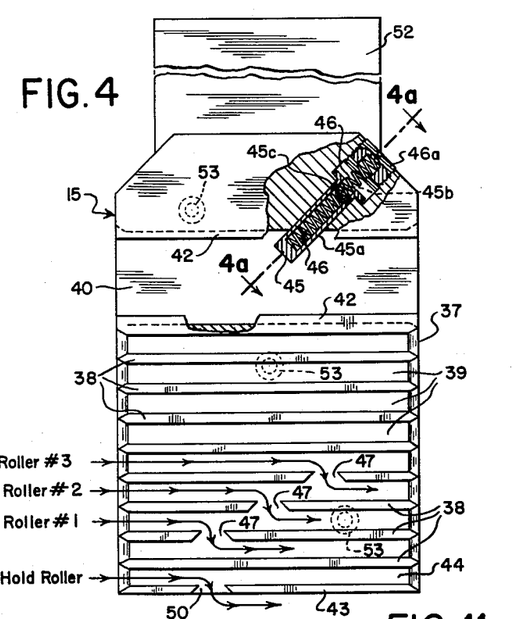
FIG. 4 is a front elevation of a reading device.
Figure 5:
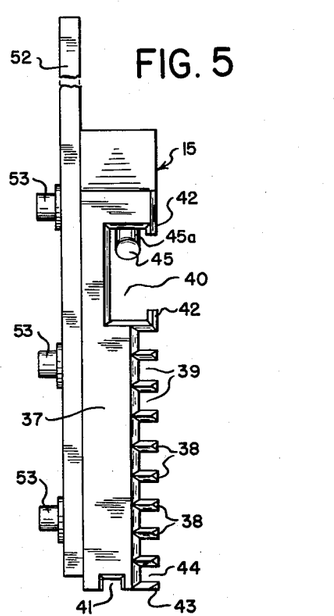
FIG. 5 is a side view of the device shown in FIG. 4 looking from the left.

Referring now to these drawings and first to FIGS. 1–8, an index device as a whole is indicated by reference numeral 14 and a reading device as a whole by reference numeral 15 (FIGS. 4–5). The index device 14 has a rectangular frame work 16 which surrounds the actuator 17 consisting of a thick rectangular metal plate (FIG. 6) mounted for vertical sliding movement between the sides of the frame work 16. This plate-like actuator 17 carries the extendable fingers. As shown there are twelve of these fingers designated by reference characters A, B and numerals 1 to 10 inclusive.

Figures 6, 7, 8:
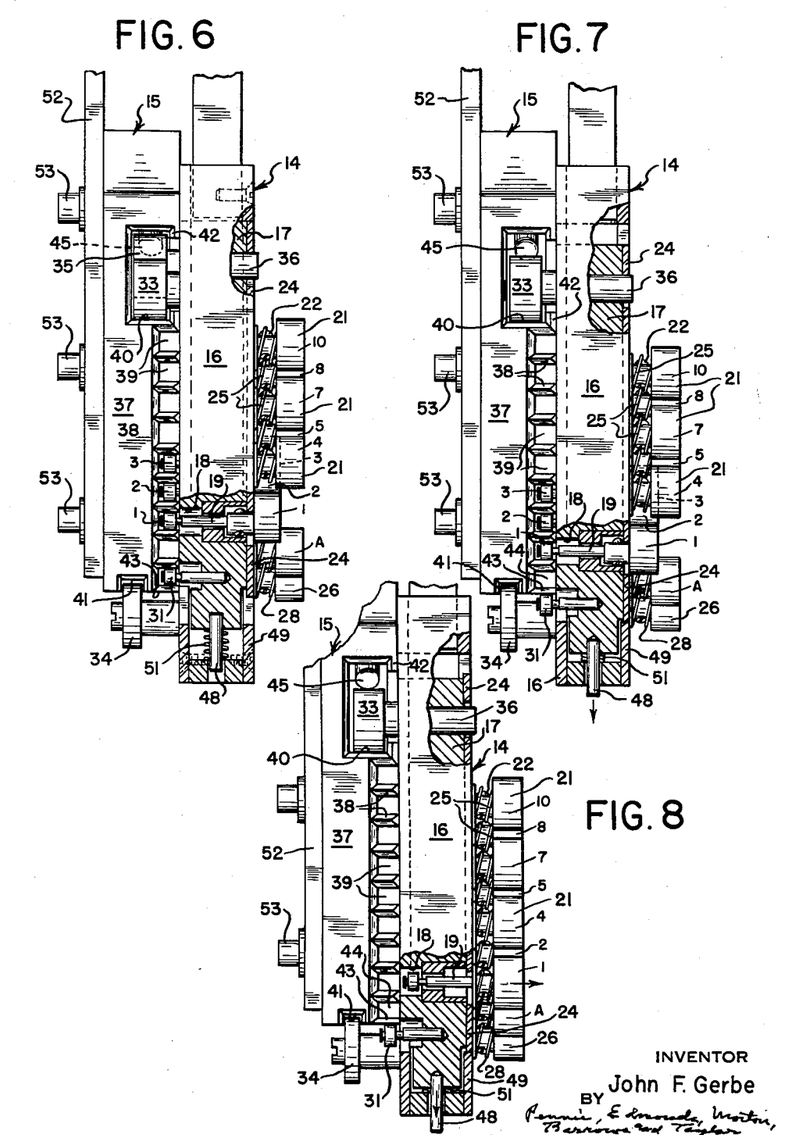
FIGS. 6, 7 and 8 are side views of an index device and a reading device in engagement with one another, parts being in different positions in each of these views.
Figure 9:
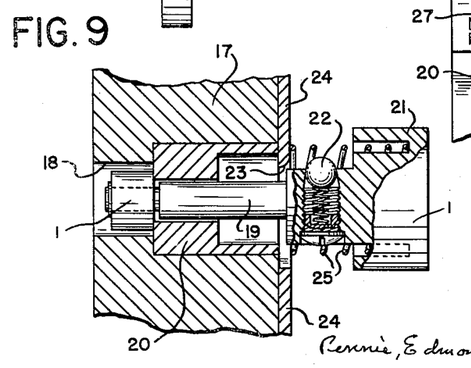
FIG. 9 (Sheet 2) is a detailed vertical section taken on line 9—9 of FIG. 1.
Figure 9A:
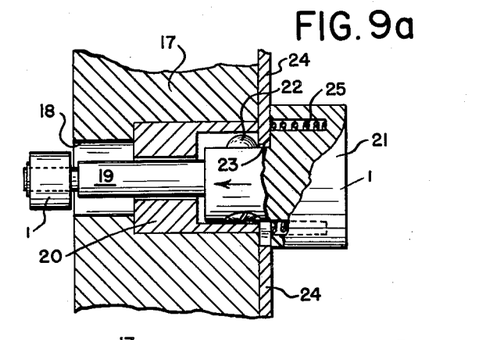
FIG. 9a is similar to FIG. 9, but showing parts in different positions.

These fingers are mounted in the actuator plate 17 in any suitable manner which will permit them to be shifted from a withdrawn position where each finger is received within a recess 18 (FIGS. 2, 7 and 9) in the rear surface of the actuator, to an extended position where the fingers project beyond the rear face of the actuator as shown, for example, in FIGS. 3 and 6. One form of mounting for the extendable fingers is shown in FIGS. 9 and 9a. The fingers are illustrated as small rollers each turning on the left end of a shiftable pin 19. This pin slides in a bore in a bushing 20 which is fixed in a counterbore at the right of recess 18.

Fixed on the right ends of the pins 19 there are actuating buttons 21, these buttons also being designated by the same reference characters as the fingers, namely, by A, B and 1 to 10. In the hub of each button 21 there is arranged a spring-pressed ball detent 22 which co-operates with the upper edge 23 of an aperture in a shiftable locking plate 24 which is mounted on the front face of actuator 17. When any one of buttons is pressed to the left is compresses a coil spring 25 and shifts detent 22 to the left of the locking plate 24, the hub of the button entering a recess in bushing 20.

The construction of the mounting of all of the twelve buttons is the same so that there are twelve slots with locking edges 23 in the locking plate 24, one for each of the twelve buttons. The locking plate is held in position by the pressure of the twelve springs 25 but can be shifted relative to the surface of actuator 17, in a manner to be described, in order to release the extended fingers and allow them to return to their retracted positions under the action of their coil springs 25.

Figure 10:
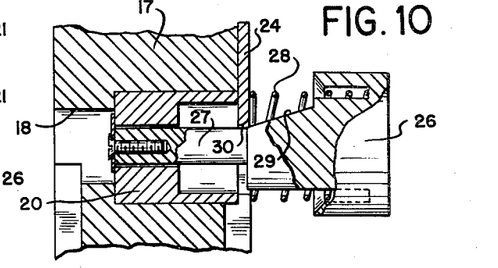
FIG. 10 is a detailed vertical section on line 10—10 of FIG. 1.
Figure 10A:
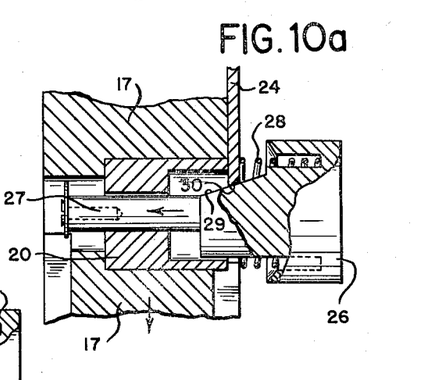
FIG. 10a is a view similar to FIG. 10, but with parts in different positions.

Referring to FIGS. 10 and 10a a releasing button 26 is provided for use in case an error should be made in setting, that is, extending the index fingers, so that all buttons may be "cleared" and then re-set. The shank 27 of this button is slidably mounted in a suitable support in the actuator plate 17 and is normally held in its outer position (FIG. 10) by means of a coil spring 28. A cam surface 29 formed on shank 27 engages the upper edge 30 of a slot in locking plate 24.

This plate is shown in locking position in FIG. 10, that is, in its normal position. The plate is shown in this position also in FIG. 9 and in FIGS. 1 and 6, so that any of the index buttons A, B and 1–10 which may have been pushed in to extend the index fingers according to a predetermined button, are held locked in such position. However, should a mistake have been made in pressing the correct buttons, all of the buttons will be simultaneously released and returned to their retracted positions by pressing the release button 26 which will cause its cam surface 29 to effect relative movement between actuator plate 17 and locking plate 24 as indicated in FIG. 10a.

In addition to the index fingers and corresponding buttons A, B and 1–10, the "button board" or actuator 17 is provided with a finger or roller 31 which will be referred to as the "hold roller" and the purpose of which will be referred to later on. This hold roller is mounted on a pin which is fixed to and projects from the rear of actuator 17 (FIG. 6). It is not retractable.

Figures 1, 2:
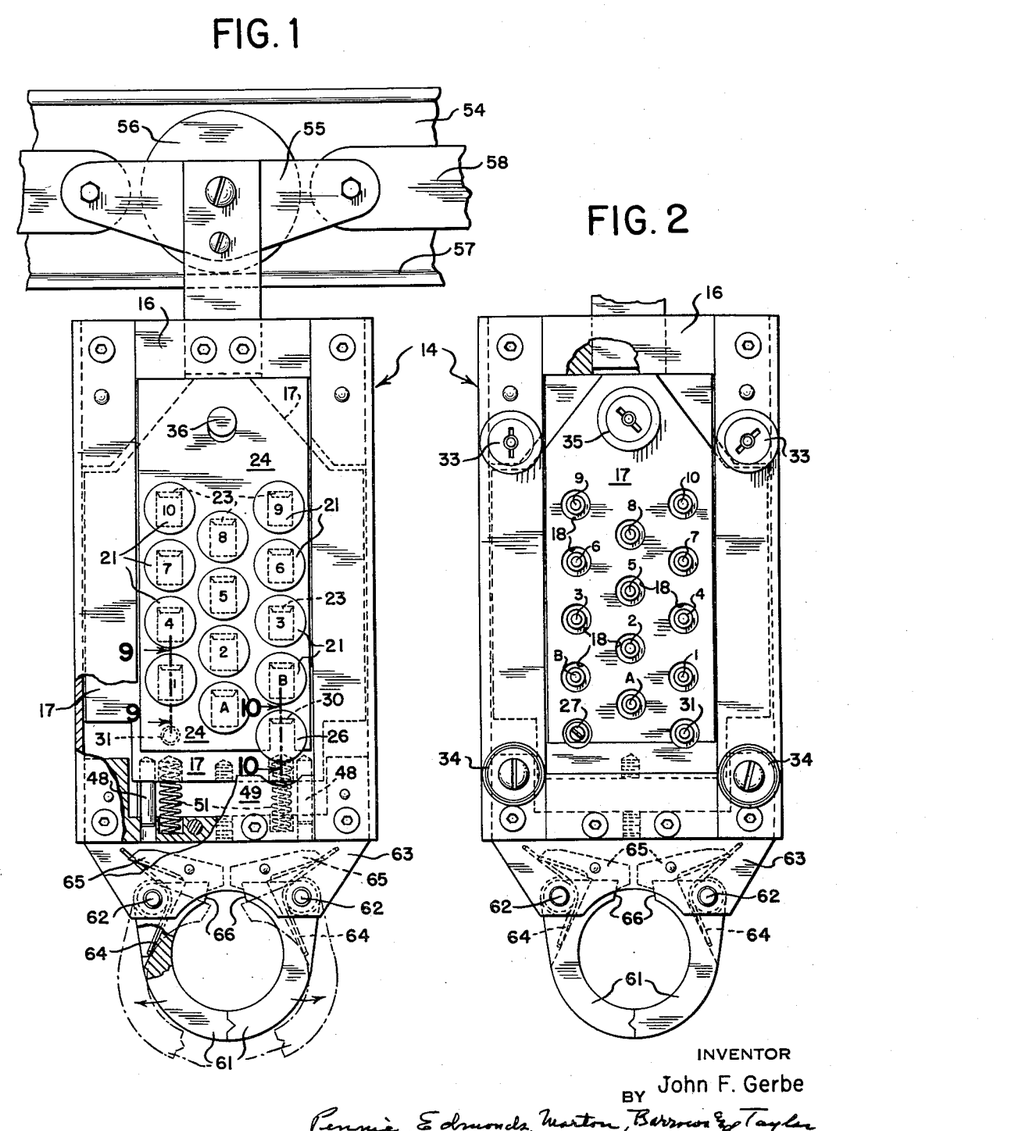
FIG. 1 is a front elevation of an index device equipped with a pair of jaws for carrying a load.
FIG. 2 is a rear elevation of the device shown in FIG. 1.

Also projecting in fixed position from the rear of index device 11 are two upper guide or positioning rollers 33 and two lower guide or positioning rollers 34 (FIGS. 2 and 3). The rollers of each pair are spaced as far apart as possible and are mounted on stationary bearing pins projecting from the frame work 16. A fifth or operating roller 35 for the actuator 17 rotates on a fixed pin 36 which projects at all times from the rear surface of actuator plate 17. All of these rollers will be referred to presently.

Referring now to FIGS. 4 and 5 the reading device 15 comprises a rectangular body member 37 having a plurality of equally-spaced parallel rails 38 projecting from and extending across its front face and forming between them a series of equal-width channels 39. As index device 14 and reading device 15 are moved one with respect to the other and brought into engagement, the upper guide rollers 33 enter a groove 40 in member 37 above the rail area, and the lower guide rollers 34 enter a groove 41 extending along the bottom edge of the body member. The opening edges of both of these channels are flared as indicated in FIG. 6 to facilitate the entry of the rollers.

The upper groove 40 is provided with vertically projecting lips 42 and the rollers 33 and 35 fit closely between these lips and the rear wall of groove 40; also the lower rollers 34 fit closely the width of the groove 41. In this way any of the index fingers A, B and 1–10 which have previously been extended are guided into the channels 39 between rails 38. The ends of these rails may also be sloped to facilitate such entrance. In addition to rails 38 and channels 39 a bottom rail 43 with a channel 44 above it is provided for the hold roller 31.

As the index device 14 engages or passes "through" the reading device 15, the guide rollers 33 and 34 pass through their respective positioning grooves and the index fingers pass through their respective channels 39. Also operating roller 35 is carried along the upper part of groove 40 (FIG. 6) and engages a short, downwardly facing cam 45 which urges the actuator plate 17 downwardly.

Now let us assume that interruptions 47 have previously been placed in three of the rails 38 forming a continuously ascending pattern, as shown in FIG. 4; also that buttons 1, 2 and 3 have been pressed and have caused index fingers 1, 2 and 3 to be extended as shown in FIG. 6. The pattern of these three index fingers matches the pattern of the three interruptions 47. Fingers 1, 2 and 3 will follow the paths indicated by the arrows in FIG. 4, and when roller 35 has been engaged by cam 45 the extended fingers 1, 2 and 3 will pass through the matching interruptions 47 so that the actuator 17 will shift downwardly in frame work 16 under the action of cam 45, and each of the three respective fingers will rest on the next respective lower rail 38. The lateral relative motion of the index and reading devices will continue and the devices will separate along the right vertical edge of the reading device.

In FIG. 6 the fingers 1, 2 and 3 are shown in the channels 39 by which they entered the reading device, whereas in FIG. 7 the fingers have shifted downward one channel. This downward movement of actuator 17 is employed to cause the desired action to take place. Such desired action may, for example, be the operation of a switch 46b (FIG. 11) to close or open an electrical circuit, or this motion of the actuator plate may perform any other action or operation which can be brought about by a comparatively small amount of mechanical motion. The device to be actuated, whether an electrical switch, valve, or other device, is operated by means of a pair of pins 48 (FIGS. 1 and 6–8) which are fixed at their upper ends in the lower edge of actuator plate 17 and project downwardly through openings in the lower cross member of the index device frame work 16.

It will be understood that when a series or plurality of the reading devices 15 are employed, with an index device 14 moving successively to and through the various reading devices, each of the reading devices will have differing patterns of rail interruptions 47. Then the fingers A, B and 1–10 of the index device can be extended to match any of these pattern arrangements, according to the location where the desired action is to take place. When the reading device has rails 38 of the number and length illustrated, a very considerable number of different pattern arrangements of the rail interruptions can be made, and, should it be desirable to use a large number of stations or reading devices 15 the number of possible pattern arrangements can be increased almost indefinitely by increasing the number of rails 38, or increasing their length, and by increasing the number of extendable index fingers correspondingly.

During the downward movement of the actuator plate 17 all of the index fingers which have been extended are released and allowed to spring back to their normal retracted position, as shown in FIG. 8. This is brought about by the shifting of locking plate 24, and FIG. 7 illustrates the position of the parts just before such shifting of the locking plate occurs. FIG. 7 illustrates an intermediate position between the two extreme positions of the actuator 17 shown in FIGS. 6 and 8 respectively. In other words, FIG. 7 shows the actuator 17 and locking plate 24 after they have moved part way down.

In this figure the lower edge of locking plate 24 has just contacted the upper edge of a stop plate 49 mounted on the front of the cross member 16 at the bottom of the index member frame. The continued downward movement of actuator 17, with locking plate 24 held by the edge of this stop plate causes a slight relative shifting of the locking plate on the surface of the actuator and releases the ball detents 22 (FIG. 9) of all of the index fingers which have been previously moved to extended position. Their coil springs 25 immediately cause these index fingers to shift outwardly so that all of the operating buttons are in alignment, as shown in FIG. 8, and all of the index fingers have been withdrawn within their respective recesses 18.

The purpose of hold roller or finger 31 is to maintain the actuator 17 in its downward position until the index device completes its passage through its reading devices. Accordingly, when the downward shifting movement of actuator 17 takes place, hold roller 31 moves downwardly from channel 44 through an aperture 50 in the lowermost rail 43 of the reading device, following the path indicated by the arrows in FIG. 4 and rolls along the bottom of this rail. When the index device clears the right side of the reading device, hold roller 31 is released from the right end of rail 43, and actuator 17 is returned to its uppermost position (FIG. 6) by means of two coil springs 51 (FIG. 1).

Cam 45 is mounted in such a way as to yield and retract when the force exerted on it by roller 35 exceeds a predetermined amount, as for example when the patterns of the extended fingers and the interruptions 47 do not match so that the button board or actuator 17 does not move downwardly, and the index device is carried on to the next reading device. As shown in the drawings (FIGS. 4 and 5) cam 45 is formed on the lower end of an angularly directed plunger 45a which is slideably arranged in a bore that intersects the upper wall of groove 40 and extends downwardly and forwardly or toward the left at an angle of approximately 45°.

Figures 4A, 24:
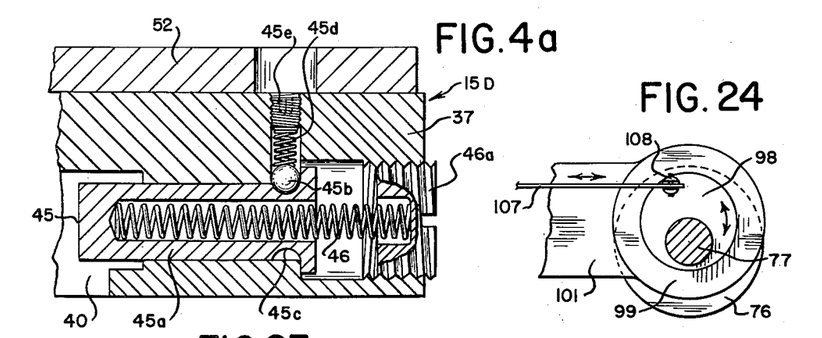
FIG. 4a is an enlarged detailed section taken on line 4a—4a of FIG. 4.
FIG. 24 is a horizontal section taken on line 24—24 of FIG. 23.

In order to permit cam 45 to yield upwardly and allow operating roller 35 to pass beneath it without downward movement, plunger 45a is provided with a spring-pressed ball detent 45b (FIG. 4a, Sheet 8). This detent ball is received within a semi-circular groove 45c adjacent the head of the plunger, and is urged into this groove by a compression spring 45d, held in place by a screw plug 45e by which the force of the spring can be adjusted. Assisting the ball detent 45b in resisting the upward motion of plunger 45a due to the engagement of operating roller 35 with cam 45 there is a compression spring 46. The outer end of this spring bears against a screw plug 46a by means of which the force exerted by spring 46 can be adjusted. By adjustment of this plug 46a and of plug 45e, for the ball detent 45b, the cam 45 may be made to cause adequate downward urging of the actuator 17 to perform the desired action, such as the operation of switch contacts 46b (FIG. 11), and to release the cam to allow passage of operating roller 35 when the force exerted by this roller exceeds a predetermined amount.

Figures 11, 20:
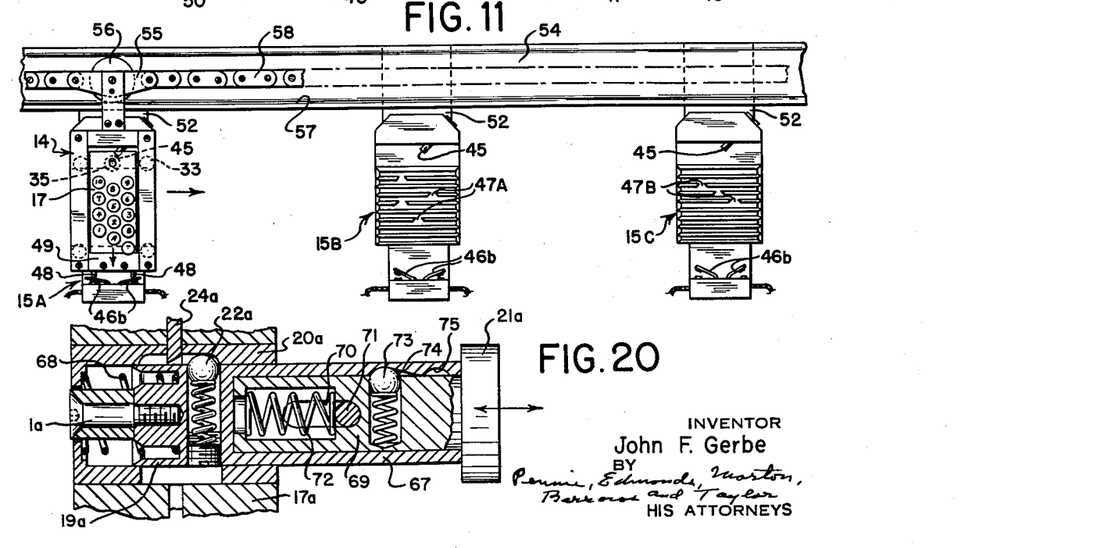
FIG. 11 (Sheet 3) is a view showing the application of the invention where the desired action is the operation of electrical switches.
FIG. 20 (Sheet 3) is a detailed vertical section somewhat similar to FIG. 9 showing a modified form of extendable finger and operating button.

Reading devices 15 are secured to hangers 52 by means of socket head bolts 53 and these hangers may be mounted upon any suitable support. Referring further to FIG. 11 three reading devices 15A, 15B and 15C are shown as being typical of a series of any desired number of any such devices, and their hangers 52 are secured to a support in the form of a beam 54. The index device 14 is suspended from a carriage 55 having one or more rollers or wheels 56 which moves along a rail 57 which is coextensive with beam 54. Movement of the index device into successive engagement with the reading devices is brought about by means of an endless chain 58.

The patterns of the rail interruptions 47 differ from one another, the pattern for reading device 15A being the same as previously described, and as shown in FIG. 4. Patterns 47A and 47B for the rail interruptions of reading devices 15B and 15C are as shown in FIG. 11. The index fingers which have been extended in the index device 14 at station or reading device 15A are the same as previously described and, therefore, match the interruptions 47. Accordingly, the actuator 17 has shifted downwardly and closed the contacts of electrical switch 46b mounted at the lower portion of reading device 15A.

Whenever index device 14 passes through, that is, the engagement with a reading device 15 where the pattern of the extended index fingers A, B and 1 to 10 do not match the rail interruptions 47 of such reading device, the spring-pressed plunger 45a is raised against the flexing of spring 46 by the operating roller 35 and the plunger returns to its normal position after passage of this roller. The extended index fingers enter the left ends of channels 39 and take their exit from the same channels from the right end thereof without any downward shifting. Such will be the operation as the index device 14 passes through the reading devices 15B and 15C of FIG. 11, and the electric switches 46b, which are mounted on these reading devices, will not be closed.

Figures 12, 13, 14:
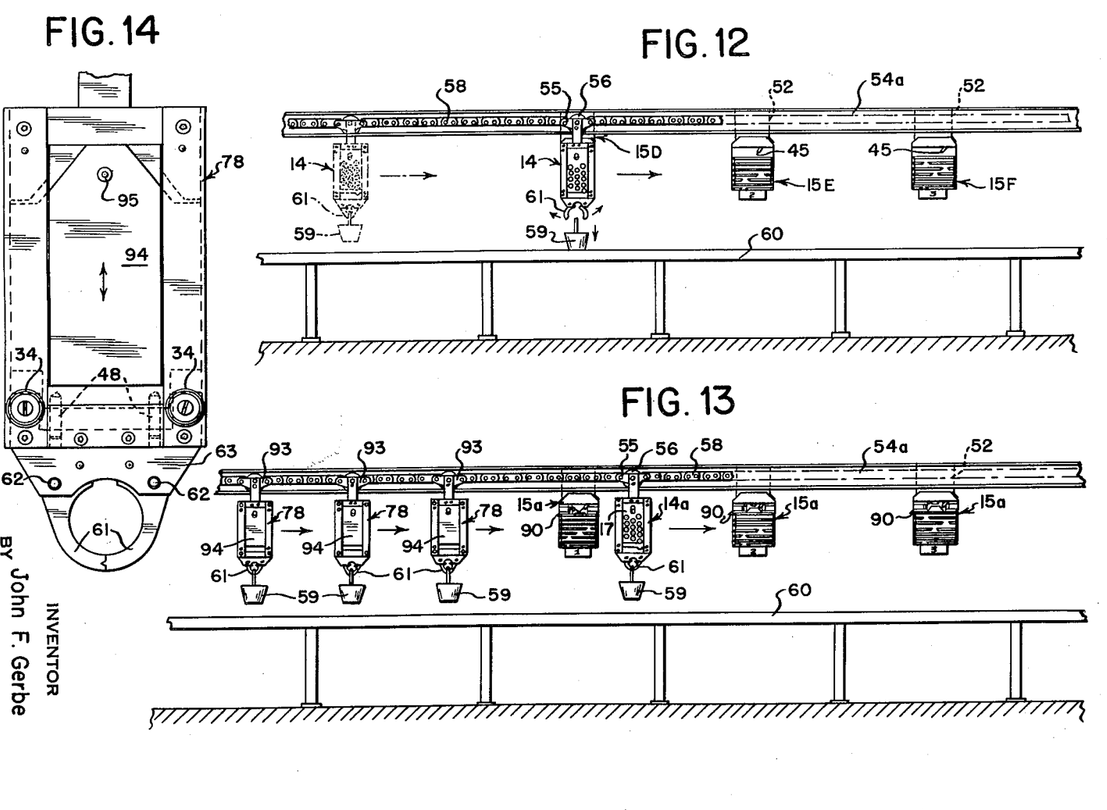
FIG. 12 is a partial side elevation showing the application of the invention to a conveyor system.
FIG. 13 is a view similar to FIG. 12 showing a modified form of such system.
FIG. 14 is a front elevation of a carrier device for use with the conveyor system of FIG. 13.

Referring now to FIG. 12 there is here shown a conveyor system by which articles of various sorts may be delivered at any one of a number of pre-selected stations. For example, machine parts or other work pieces may be carried in a bucket or other container 59 and delivered at a station or position along a work bench 60 where a certain operation is to be performed by hand, or otherwise.

At a suitable height above the work bench on I-beam 54a is mounted in fixed position in any appropriate manner, and as in FIG. 11 a plurality of reading devices 15D, 15E and 15F, etc., are mounted by their hangers on this beam at suitable work stations arranged along the bench 60. These stations and the reading devices may or may not be equally spaced. Also as in FIG. 11, the wheels 56 for the index carriages 55 roll along the lower webs or flanges of beam 54a. It will be understood that the rail interruption pattern arrangements 47 will be different for each of the reading devices 15D–F, as indicated. Also the movement of carriage 55 and index device 14 is controlled by means of the endless chain 58.

When the index device 14 is to operate as part of a conveying system, it is provided with the cooperating pivoted jaws 61 which are mounted at the bottom of the index device. For this purpose these jaws are pivoted at 62 to a bracket member 63 which is mounted in fixed position on the bottom of the index device. These jaws are biased toward closed position by means of a pair of springs 64. These springs are coiled around the pins of pivots 62, their lower arms engaging the jaws 61 and their upper arms engaging respectively a pair of latches 65. These latches are also pivoted on or within brackets 63 and their hook-shaped inner ends engage lateral extensions 66 of the jaws to lock the jaws in closed position. The jaws are opened by the downward movement of actuator 17 which causes the two pins 48 to engage and release the latches 65. Thereupon the weight of the load, such as bucket 59, which is supported by the jaws 61 causes the opening of the jaws and the release of the load.

Returning now to FIG. 12, at a suitable location such, for example, as the dot-and-dash position shown at the left of this figure (which may be at any desired distance from the delivery stations) container 59 is filled with machine parts or other articles to be delivered at one of the stations 15D, 15E, 15F, etc., and is placed with the bail thereof within the jaws 61, and certain of the buttons A, B and 1–10, are pushed in so as to extend the corresponding fingers in the pattern corresponding to that of the particular station where it is desired to deliver the articles. The chain 58 is then set in motion, or may be continuously in motion, and carries the index device 14 forward to the right.

When it reaches the reading device whose rail interruption pattern corresponds with the setting of the fingers, the downward movement of actuator 17 will take place, as previously described, thereby causing its actuating pins 48 to operate latches 65 and cause the opening of jaws 61 and the discharge of the container 59 onto the work bench 60. The index device 14 will continue its circuit through all of the other reading devices 15E, 15F, etc., until it returns to the starting point, namely, the dot-and-dash position referred to. In the meantime other index devices 14 may be loaded with articles for delivery at the other stations and their index fingers set so as to cause delivery at such stations.

Figure 21:
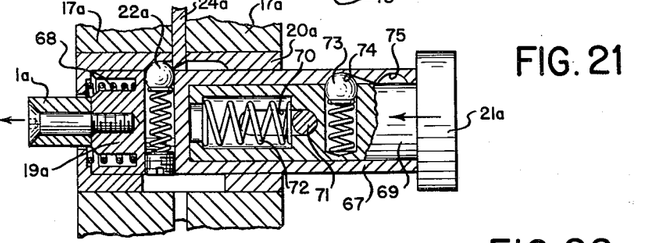
FIG. 21 is a view similar to FIG. 20 with parts in different positions.
Figure 22:
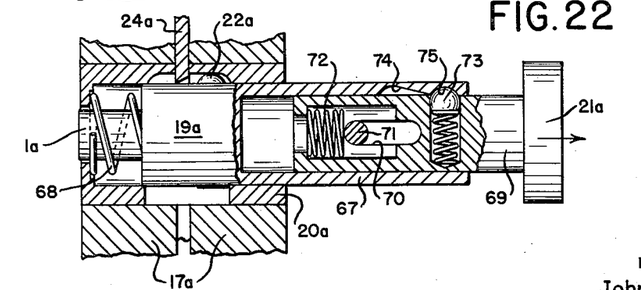
FIG. 22 is also similar to FIG. 20 with parts in still different positions.

It may be desired to discharge goods at a given station, and then send the index device to a particular subsequent station to be re-loaded. In order to accomplish this, a specially constructed mounting for the index fingers is provided, as shown in FIGS. 20, 21 and 22 (Sheets 3 and 7).

Referring to FIG. 20, a plunger 19a, which corresponds to pin 19 of FIG. 9 but is considerably larger in diameter than pin 19, carries a finger, for example, finger 1a, at its inner end, and is mounted for sliding movement in a bushing 20a. In the left end portion of plunger 19a there is a ball detent 22a which cooperates with the upper edge of an aperture in locking plate 24a. In this construction the locking plate is disposed centrally of the plate-like actuator 17a, which, conveniently, may be made in two half portions which are assembled in slightly spaced relation to receive the locking plate. Plunger 19a is biased toward the right by means of a coil spring 68 which corresponds to spring 25, but is differently located.

The button member or head 21a of this construction is provided with a cylindrical stem 69 which fits within the interior of a hollow, cylindrical extension 67 of plunger 19a, and is slidable therein. This stem member is slotted, as indicated at 70, and held in position by means of a cross-pin 71, the opposite ends of which are fixed in the walls of extension 67 and the mid-portion of which is received within slot 70. A second coil spring 72 bears at its right end against cross-pin 71 and at its other end against a shoulder in the recess in the left end of stem 69 within which this spring is mounted. Consequently, the parts are biased towards the position shown in FIG. 20 where the button 21a rests against the end of the hollow, cylindrical extension 67.

A second spring-pressed ball detent 73 provides a two-position shift of the button 21a with respect to the shell or hollow, cylindrical projection 67. These positions are determined by recess 74, which has a gently sloping outer wall, and by a semi-circular recess 75. The arrangement is such that detent 73 is easily shiftable to the right, but resists being shifted to the left.

With this form of mounting for each of the fingers A, B and 1–10, the fingers may be extended in the manner previously described merely by inward pressure on the buttons 21a. This not only projects or extends the particular finger, but also compresses spring 68 and moves ball detent 22a past the edge of locking plate 24a so that it is locked in position on the left of this plate, as shown in FIG. 21. The remaining parts of the mounting are, at this point, in the same position as shown and described in connection with FIG. 20. The index fingers will be extended to form a pattern to match that of the rail interruption pattern of the reading device of the station where it is desired to discharge the load, for example, reading device 15D of FIG. 12.

Should it also be desired to have the same index device pick up a load at one of the subsequent stations, such, for example, as the reading device 15F, the buttons 21a are now shifted or pulled outward to the position shown in FIG. 22, but leaving the fingers extended as in FIG. 21. The buttons will be pulled out according to the pattern of the rail interruptions of reading device 15F, and such pattern may include fingers that have not been extended in setting for the discharge of the load at reading device 15D. The pulling out of each of these buttons 21a merely causes the ball detent 73 to shift from recess 74 to recess 75 and compresses coil spring 72. If an index finger has been extended in such previous setting it remains extended, that is, in the position of FIG. 21, and the ball detent 22a remains locked at the left of locking plate 24a.

When the index device 14 reaches the discharge station, that is, reading device 15D, the operation of locking plate 24a, as previously described, will release all of the ball detents 22a of the several fingers which have been set according to the pattern of reading device 15D. Thus, all of these fingers are retracted, and the various parts of the mounting now occupy the position shown in FIG. 22 where all of the buttons 21a which were pulled outwardly according to the pattern of the pick up station, that is, of reading device 15F, are projected to the right a considerable distance beyond the remaining buttons (compare FIGS. 21 and 22).

After the index device 14 leaves station 15D the buttons 21a projecting as in FIG. 22, are engaged by a roller 76 (FIGS. 23 and 25) which is arranged to rotate on a vertical shaft 77, and are pushed inwardly causing their index fingers to be extended. The pattern of these fingers corresponds with the rail interruption pattern of reading device 15F and, accordingly, when the index device engages this reading device, the downward movement of its actuator 17 will take place as previously described and cause the pick up of a load in any suitable manner, as previously indicated.

When the buttons 21a are forced inwardly by roller 76, the ball detent 73 remains in the semi-circular recess 75 and causes the hollow, cylindrical extension 67 and plunger 19a to be shifted to the left, again compressing spring 68 and causing detent 22a to again lock on the left side of locking plate 24a. Later, sufficient manual pressure can be exerted against the buttons 21a to dislodge ball detent 73 and cause the parts again to assume the position of FIG. 20. It will be understood that the shaft 77 of roller 76 may be mounted in stationary position at any point between the discharge station or reading device 15D, and the pick up station or reading device 15F.

Attention is now directed to FIG. 13 which shows a modified arrangement of the conveyor system of FIG. 12 by means of which a larger quantity of articles can be discharged at any desired station under the control of a single index device 14a. With this apparatus a special form of reading device 15a and a plurality of carrier devices 78 are provided and both of them will presently be described. Also a slightly modified index device 14a is used. The engagement of the index device 14a with a reading device 15a, which has a rail interruption pattern that matches the pattern of the extended fingers of the indexing device, causes the setting of the special form of reading device which enables this device to trip the carrier devices successively as they come into engagement with the particular reading device. Such tripping causes the discharge of the loads carried by the respective carrier devices.

Figures 15, 16, 19:
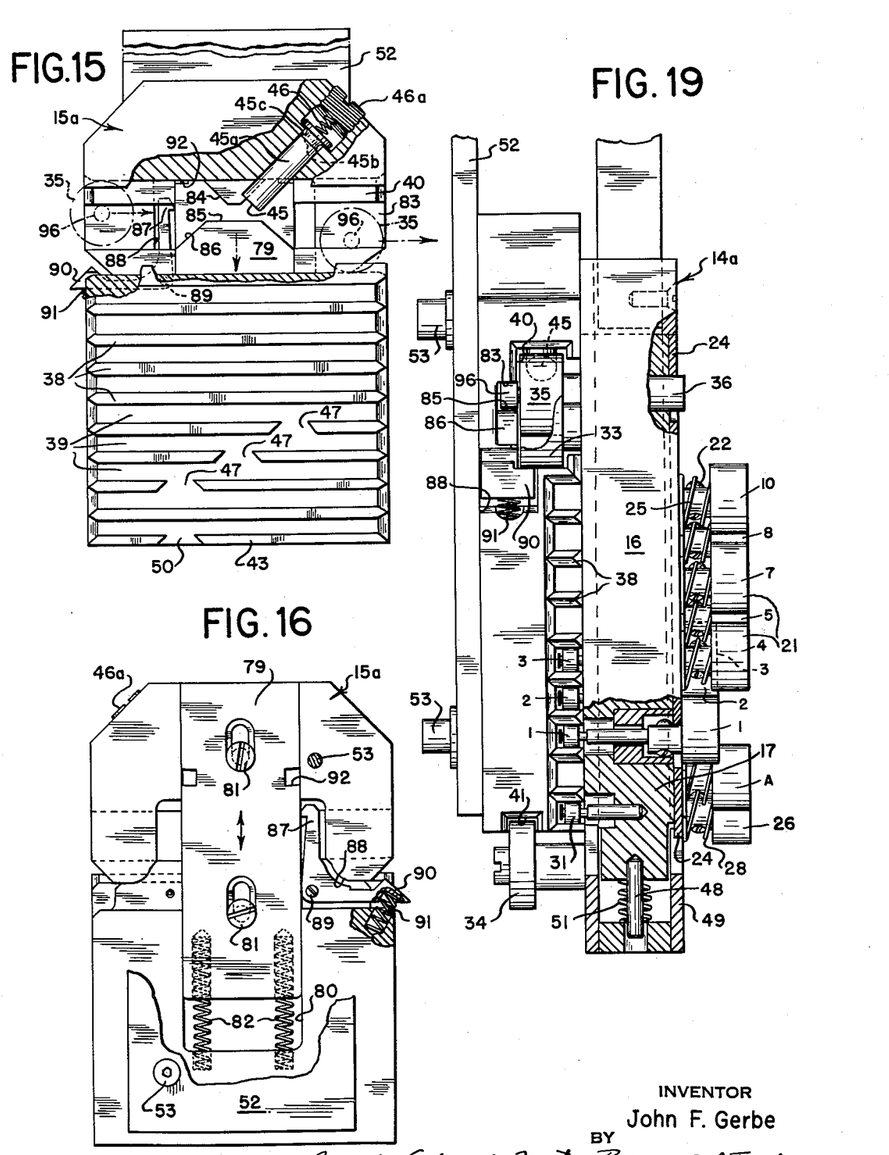
FIG. 15 is a front elevation of the modified reading device.
FIG. 16 is a rear view of the device shown in FIG. 15.
FIG. 19 is a view similar to FIG. 6 showing the modified index and reading devices in engagement with one another.

Referring to FIGS. 15–19 the reading device 15a is constructed like reading device 15 except that a vertically shiftable cam plate 79 is mounted in a recess 80 at the rear of the reading device. This plate is slotted and is held in position by a pair of screws 81 in these slots (FIG. 18) and is biased upwardly by a pair of compression springs 82. The bottom surface of slot 40 of the reading device is milled, or otherwise cut away, centrally throughout its length to form a secondary slot 83 (FIG. 19).

The front surface of cam plate 79 is also recessed to about the same depth as the secondary slot 83 and in such a way as to form a carrier tripping cam 84 and an abutment 85 which is spaced below the lower end of cam 84 for a purpose which will presently appear. The leading edge of abutment 85 is also formed as a cam surface 86 and functions as a safety device.

When the cam plate 79 is shifted to its down position (FIG. 17) the cam 84 is in its tripping position and it is held in this position by means of an L-shaped latch 87 which is mounted in a suitable recess 88 formed in the rear surface of reading device 15a and pivoted at 89 thereto. The tail portion of latch 87 is provided with a wide and cam-shaped head portion 90 below which is a spring 91 which biases the latch to latching position in engagement with a notch 92 (FIG. 17) in the side of cam plate 79. Head portion 90 is of sufficient width to extend outwardly into slot 40 and into the path of the upper guide rollers 33 of the index device 14a.

The carrier devices 78 are constructed, as shown in FIG. 14, and may be quite similar to the index devices 14a except for the omission of the actuator 17 and the index buttons and fingers A, B and 1–10. Also the two upper guide rollers 33 are omitted and operating roller 35 is omitted. The lower guide rollers 34, however, are present on the carrier devices and these serve to engage the lower groove 41 of the reading device and properly position the carrier with respect to this device. The carriers 78 are supported on carriages 93 which are identical with the carriage 55 for the index device and are connected to chain 58 at suitable distances behind the index device 14a.

Instead of having actuator plate 17 with its complement of index fingers, the carriers 78 are provided with a simple vertically movable plate 94 which has a small finger or roller 95 projecting from its front face near the top. This plate is biased upwardly by springs similar to springs 51, but not visible in FIG. 14 and is provided with pins 48 whose downward movement actuates the latches of the jaws 61.

Figure 17:
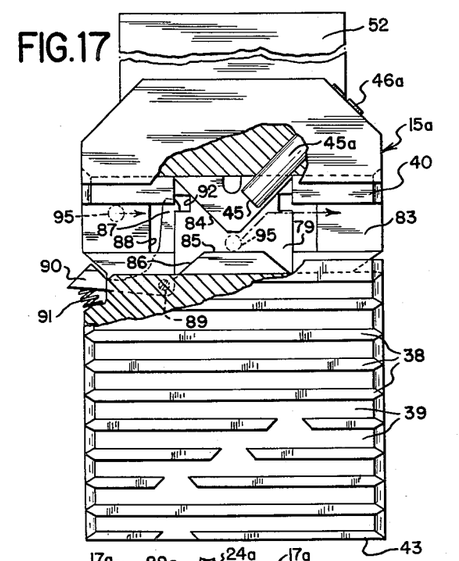
FIG. 17 is a view similar to FIG. 15 but with parts in different positions.
Figure 18:
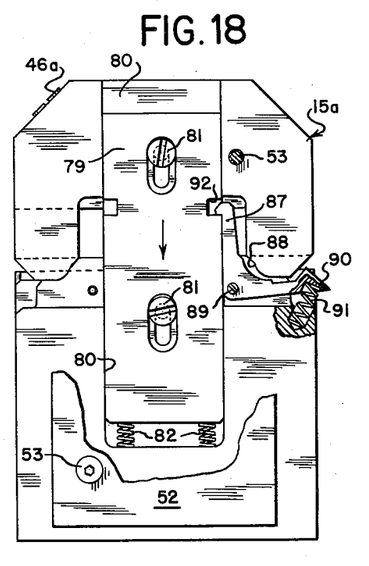
FIG. 18 is a rear view of the reading device of FIG. 17.

In FIG. 17 the cam plate 79 has been shifted downward and set in its carrier releasing position where it is held by the latch 87. When a carrier device 78 passes through a reading device 15a with its cam plate so set the guide rollers 34 engage the bottom groove 41 and the finger or roller 95 enters the upper groove 40 at the level indicated in FIG. 17 by the small dot-and-dash circle. As the carrier device continues its movement toward the right this finger 95 engages the tripping cam 84 by which the finger is forced downwardly thereby causing the plate 94 to move downwardly and release the jaws 61 so that they can open and discharge their load. As the movement of the carrier continues roller 95 passes along the right-hand sloping surface of cam 84, plate 94 being urged upwardly by the pair of springs beneath it, and the roller leaves the reading device at the same level at which it entered.

From FIGS. 15 and 19 may be seen the manner in which the cam plate 79 is set in its lower position by the index device 14a which precedes the group of carrier devices 78. In these figures plate 79 is shown in its upper position to which it is urged by the two springs 82 at the bottom of this plate (FIG. 16). Contact of the two screws 81 with the bottoms of their respective slots limits the upper movement of the plate.

In FIG. 19 an index device 14a is shown in engagement with a reading device, such as the reading device 15a of FIG. 15 where the cam plate 79 is in its upper position. As previously stated, the index device 14a is slightly modified from the index devices 14, previously described. The only difference between these devices is that device 14a has a small roller or finger 96 mounted on the axis of operating roller 35 and projecting rearwardly therefrom. In FIG. 15 the roller 35 and the finger or roller 96 are indicated in dot-and-dash outline. These members enter groove 40 from the left at the level indicated, which is slightly above the abutment 85 on plate 79.

In FIGS. 15 and 19 it will be understood that the patterns of the rail interruptions 47 and the extended fingers 1, 2 and 3 of the index device 14a match one another. Hence, when the extended fingers reach the interruptions 47 the spring-pressed plunger 45 will have engaged operating roller 35 and will cause the previously described downward movement of actuator 17 of the index device. This not only causes the release of the jaws 61 which may be mounted at the bottom of index device 14a, but also the small roller 96 engages abutment 85 and forces the cam plate 79 downwardly until latch 87 engages notch 92, thus holding the latch plate in the down position as previously described. The hold roller 31 passes beneath the bottom rail 43 and holds the parts in the lower position so that rollers 35 and 96 leave the reading device at the lower level, as indicated in FIG. 15.

Referring briefly to FIG. 13, the index fingers of index device 14a have been previously extended in a pattern corresponding to that of station 2 or the middle reading device 15a. The index device 14a has passed through the reading device at station 1 and because of the fact that the pattern of the extended index fingers does not match the rail interruption pattern of the reading device at station 1, no discharge of the load, or other action, occurred at this station.

When, however, the index device 14a reaches and engages the reading device at station 2, downward movement of the actuator 17 will occur and this will cause both the discharge of the container 59 carried by the index device and also the setting of cam plate 79 of the reading device at this station in down or tripping position. Consequently, as the carrier devices 78 successively pass through the reading device at station 2, their respective containers 59 will be discharged in the manner previously described. They will pass the reading device at station 1 because the cam plate 79 is in the upper position, as shown in FIG. 15.

In connection with the special form of double index fingers shown in FIGS. 20, 21 and 22 (Sheets 3 and 7)

it has been previously stated that the roller 76 for automatically setting the fingers for a subsequent station may be mounted at any point between the discharge station, such as station 15D, and the station, such as station 15F, where it is desired to have the subsequent operation of the index device take place. Ordinarily, however, it will be desirable to reset the index fingers immediately after the index device has made its first operation such for example as that described at station 15D.

Figures 23, 25:
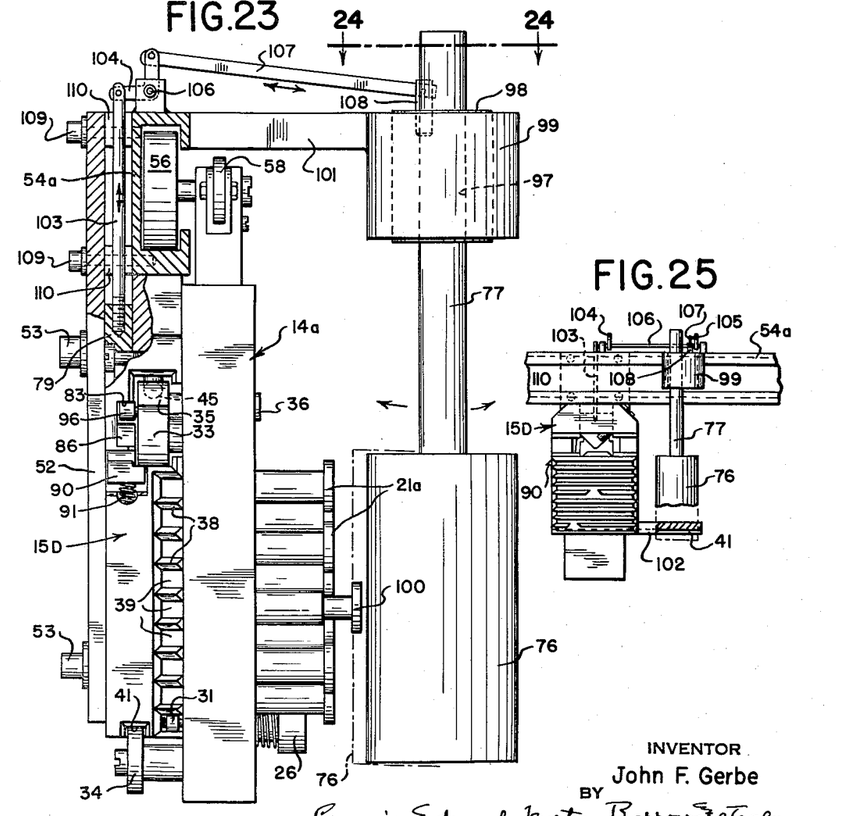
FIG. 23 is a side view somewhat similar to FIGS. 6, 7 and 8 of an index device and a reading device in engagement with one another, the index device being provided with a modified form of index fingers, together with mechanism for resetting these fingers.
FIG. 25 is a view of the parts shown in FIG. 23 looking from the right and drawn to a smaller scale.

Mechanism for mounting and controlling the position of the resetting member, or roller, 76 adjacent any reading device is shown in FIGS. 23, 24 and 25. The purpose of this mechanism is not only to support the roller 76 adjacent the reading device, but also automatically to shift this roller into operative position whenever an actuation of an index device has occurred at the adjacent reading device. Referring now to FIGS. 23–25, the vertical shaft 77 for supporting roller 76 is arranged to rotate in an elongated bearing aperture 97 which is positioned eccentrically of a cylindrical member 98 to be referred to as an eccentric.

This member is mounted for rocking movement in a cylindrical bore in a support 99. It will be understood that when eccentric 98 is in the position shown in FIG. 24 shaft 77 will support roller 76 out of the path of the setting buttons 21A, but when the eccentric is rocked in the clockwise direction of FIG. 24 roller 76 will be shifted to the dotted position of FIG. 23 into the path of any buttons which have previously been pulled out, such as for example button 100.

Support 99 is mounted on a bracket 101 which is secured to and extends horizontally from the upper part of beam 54a which is used as the supporting rail both for the stationary reading devices and for the travelling index devices. As shown in FIG. 25 support 99 is mounted just to the right of a reading device, such as reading device 15D of FIG. 12. The lower end of the reading device may be provided with an extension 102 whereby the lower guiding groove 41 of the reading device is extended so that the guide rollers 34 will maintain the position of the reading device while the index device is passing roller 76, and thus insure that the pulled out buttons, such as button 100, are pushed inwardly by the roller.

The rocking movement of eccentric 98 to cause the shifting of roller 76 as described is provided by the downward movement of cam plate 79, the operation of which has been previously described in connection with FIGS. 15–19. This plate is caused to move downwardly only if the pattern of the specially mounted fingers 21a which were pressed inwardly matches the pattern of the interruptions 47 of the rails of reading device 15D. In that event, it will be remembered that the special finger or roller 96 provided on the actuator shifts cam plate 79 downwardly. This downward movement of plate 79 is communicated to eccentric 98 through the linkage shown in FIGS. 23–25. Such linkage consists of a vertical rod 103, two bell cranks 104 and 105, a horizontal shaft 106 to which these bell cranks are fixed, and a link 107 which connects bell crank 105 with a post 108 that projects upwardly from the top of eccentric 98.

The hanger 52 which supports reading device 15D is bolted to the rear of beam 54a by means of bolts 109 which pass through spacing collars 110 in order to space the hanger away from the beam for the passage of rod 103.

I claim:

1. Apparatus for causing a desired action to take place at a remote location comprising a plurality of reading devices each comprising a body member having a plurality of equally spaced parallel rails extending across one face thereof forming channels between them, certain of the rails of each reading device having interruptions therein forming interconnecting passages between adjacent channels, said interruptions being arranged in a different predetermined pattern in each of the reading devices of said series, an index device comprising a frame member having an actuator movably mounted thereon, said actuator carrying a plurality of fingers selectively shiftable from a retracted to an extended position to form a predetermined pattern of extended fingers, said fingers being spaced to correspond with said rail spacing, means for causing relative movement between said index device and said series of reading devices causing fingers previously set in their extended position according to a desired pattern to travel between the corresponding rails of said successive reading devices, and urging means operative by the engagement of the index and reading devices so that when said index device engages a reading device in which the pattern of said rail interruptions corresponds to the pattern of said extended fingers said urging means causes said actuator to move relatively to the index frame member and thereby provide by such mechanical movement the means for causing the desired action to take place.

2. Apparatus as set forth in claim 1 wherein said urging means is mounted on each reading device and coacts with the actuator during the engagement of the index device with the reading devices.

3. Apparatus as set forth in claim 1 having in addition means for positioning the fingers of the index device in registry with the rails of each reading device as said devices pass in engagement with one another.

4. Apparatus as set forth in claim 3 wherein said positioning means comprises a pair of oppositely directed grooves on each of the reading devices, and a pair of spaced rollers on said index device arranged to cooperate with each of said grooves as the said devices engage one another.

5. Apparatus as set forth in claim 1 wherein said urging means comprises a cam on each reading device, a roller cooperating therewith, said roller being mounted on said actuator, and a mounting for said cam arranged to yield and allow the roller to pass the cam when the force exerted by the roller on the cam exceeds a predetermined amount.

6. Apparatus as set forth in claim 1 wherein movement of the actuator relative to the index frame member causes all extended fingers to be returned to retracted position, and having in addition means for maintaining the actuator in the position to which it was moved until the index device has completed its engagement of the reading device.

7. Apparatus as set forth in claim 1 having in addition means for holding the fingers in extended position, and manually operated means for releasing said holding means so as to cause all fingers to be returned to retracted position.

8. In a conveyor system of the type having a plurality of index devices associated with the conveyor and supporting goods to be moved and a plurality of reading devices located along the path of the conveyor and each of which reading devices is responsive to a particular setting of an index device to select such devices and goods at the reading device station, at least one carrier device associated with at least one of said index devices and with the conveyor, each such carrier device having a releasable support for goods to be moved additional to the goods supported by its associated index device, tripping mechanism on each of said reading devices for tripping said carrier device to cause discharge of its goods, means on said index devices for setting said tripping mechanism in tripping position, said setting means being operable when an index device is selected by a reading device, and at least one carrier device associated with the conveyor upstream of the aforesaid carrier device which is associated with an index device, the latter-mentioned carrier device being tripped similarly to the first-mentioned carrier device by said tripping mechanism set by the index device associated with the first-mentioned carrier device.

9. In a conveyor system of the type having a plurality of index devices associated with the conveyor and supporting goods to be moved and a plurality of reading devices located along the path of the conveyor and each of which reading devices is responsive to a particular setting of an index device to select such devices and goods at the reading device station, an index mechanism for said index devices which is capable of being set to respond to the reading devices at two of said stations, said index mechanism comprising a plurality of fingers movable from retracted to extended position, the mounting for each of said fingers including a two-position outwardly movable handle or knob for controlling the finger, the finger being manually pushed in by said knob to extend the fingers for the setting of one reading device station, and said knobs then being pulled out to set the index mechanism for the second reading device station, said index device including means for retracting all extended fingers at the first station, means for thereafter engaging and moving inward the said knobs which were pulled out to thereby extend the fingers controlled by said pulled out knobs to set the index mechanism for the second reading device station.

10. A conveyor system as set forth in claim 9 wherein the means for moving inwardly the pulled out knobs comprises a resetting member arranged to be engaged by the said knobs as the index devices move past said resetting member, and means for moving said resetting member into and out of the path of movement of said knobs.

11. A conveyor system as set forth in claim 10 wherein the resetting member is mounted adjacent a reading device, and the means for moving said resetting member into the path of movement of the knobs is controlled by the response of an index device to said adjacent reading device.

References Cited in the file of this patent

UNITED STATES PATENTS

| | | |
|---|---|---|
| 2,758,698 | Freeman | Aug. 14, 1956 |
| 2,796,968 | Burrows | June 25, 1957 |